United States Patent [19]

Kuhfus

[11] 3,919,496

[45] Nov. 11, 1975

[54] DIE CAST FRAME

[75] Inventor: Gerd Kuhfus, London, Canada

[73] Assignee: Northern Electric Company Limited, Montreal, Canada

[22] Filed: Oct. 25, 1974

[21] Appl. No.: 518,055

[52] U.S. Cl. .............................. 179/100 R; 179/179
[51] Int. Cl.$^{2}$ ....................... H04M 1/02; H04M 1/20
[58] Field of Search ............ 179/100 D, 100 L, 103, 179/178, 100 R, 179

[56] References Cited

UNITED STATES PATENTS 3,707,607 12/1972 Reddick .......................... 179/100 L
3,751,600 8/1973 Reichard, Jr. ................... 179/100 L

*Primary Examiner*—Kathleen H. Claffy
*Assistant Examiner*—Randall P. Myers
*Attorney, Agent, or Firm*—Sidney T. Jelly

[57] ABSTRACT

A support frame for a telephone set comprises a die casting providing a pocket or recess for a microphone, a support surface for a pushbutton assembly, a mounting for a volume control or other item, acts to acoustically seal the microphone from the remainder of the telephone set exterior and also provides weight which assists in stabilizing the telephone set on a surface. The casting has a lateral web with forward and rearwardly extending flanges on the top edge of the web. The rearward flange extends the major length of the web and the forward web extends partway. Two side webs, at each end of the forward web, cooperate with the lateral web to form the microphone enclosure. The pushbutton assembly is mounted at one end of the casting. A peripherally extending rim has a concave cross-sectional groove and a resilient seal sits in the groove and cooperates with the telephone set housing to form a sealed enclosure for the microphone.

2 Claims, 9 Drawing Figures

DIE CAST FRAME

This invention relates to support frames for telephone sets, such support frames serving as mountings for pushbuttons, volume controls, and other items, and is particularly concerned with speaker units having a speaker and a microphone, with associated circuit and control items, and adapted to be used in conjunction with a conventional telephone set having a hand set.

In a speaker unit, for example, a speaker is mounted at one position, usually at or near the top, and a microphone is mounted at a position fairly remote from the speaker. The speaker, and associated mounting, is usually relatively heavy and it is useful to provide weight at some other position to balance the unit and to assist in maintaining the unit stationary. It is also essential to separate the microphone from the loudspeaker acoustically. This requires sealing off the microphone from the loudspeaker. Various controls also need to be mounted.

The present invention provides a die cast support frame which enables several requirements to be associated in one member. Thus the support frame is relatively heavy and by being mounted at a forward position in the unit provides weight balance. It provides a pocket or recess for the microphone and has a resilient seal extending around its periphery to seal off the microphone from the remainder of the unit, and thus seal it from the loudspeaker. Pushbuttons and volume controls are also mounted on the support frame. This is an advantage as loadings imposed on the unit when actuating the pushbuttons or volume control are applied at the position where there is weight and therefore undesirable movement of the unit is avoided.

The invention will be readily understood by the following description in conjunction with the accompanying drawings in which.

Figure 9:
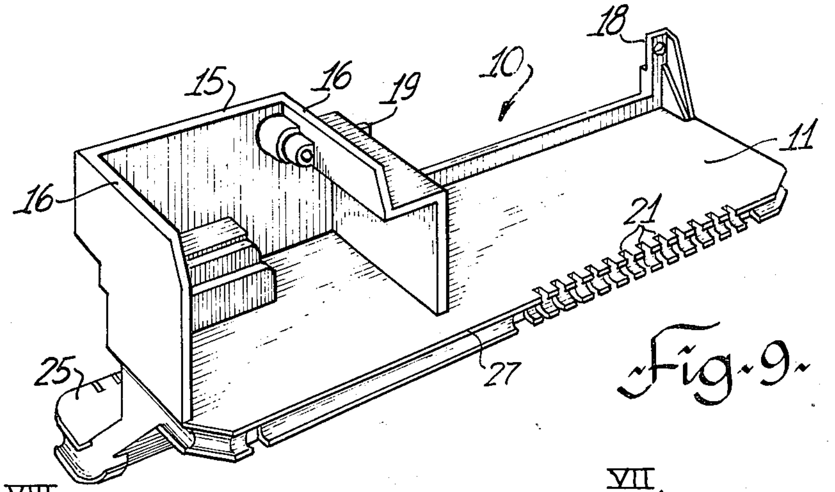
FIG. 9 is a perspective view.

The support frame, indicated generally at 10 in the drawings, is a die casting and is intended to extend right across a telephone unit, from side-to-side, and is positioned right at the forward end of the unit, being mounted on the base housing of the unit. Once in position a top housing encloses the support frame and remainder of base housing. The top housing is provided with one or more cut-outs or apertures through which access is available for items such as pushbuttons, volume control and other features.

Basically the support frame comprises a central web 11 which extends laterally for the full width of the support frame. This web extends vertically, when considered as installed in a telephone unit. Along its top edge and extending rearwardly is a top rear flange 12. Flange 12 extends for the major part of the length of web 11.

Figure 1:
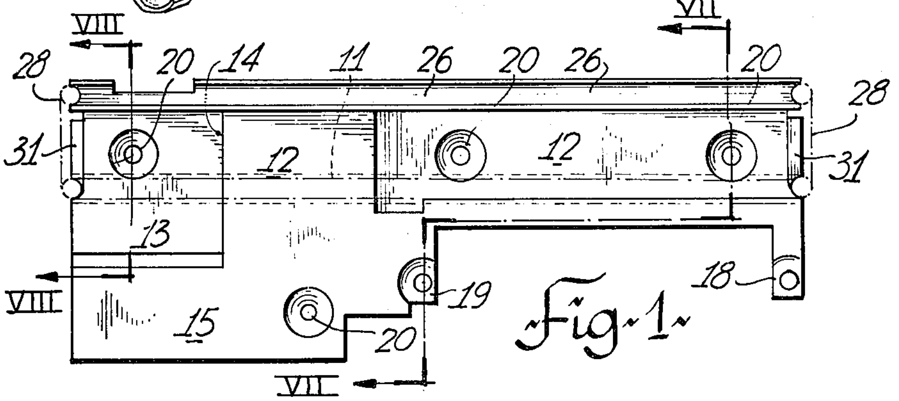
FIG. 1 is a plan view of the top surface of a support frame.

In the present example the flange 12 is at a lower level at 13 at one end, the left-hand end in FIG. 1, to provide a recess 14 in which a control, for example a volume control, can be positioned. This recess 14 also reduces the height of the central web 11 at this position.

Figure 2:
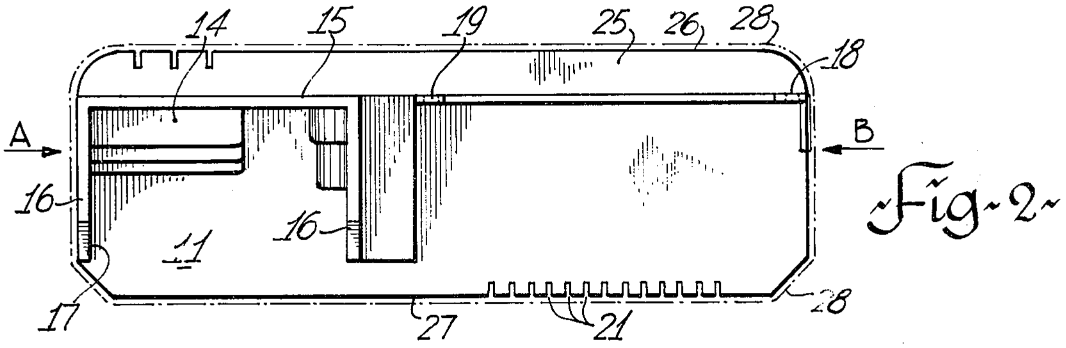
FIG. 2 is a view on the front of the frame in FIG. 1.
Figure 3:
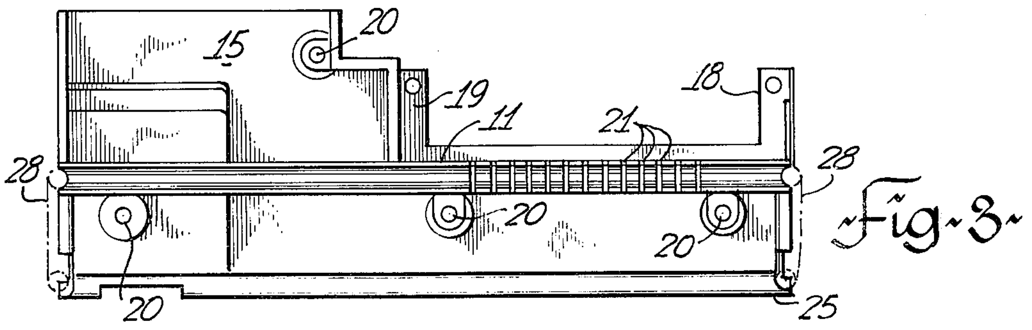
FIG. 3 is a view on the base of the frame in FIG. 1.
Figure 4:
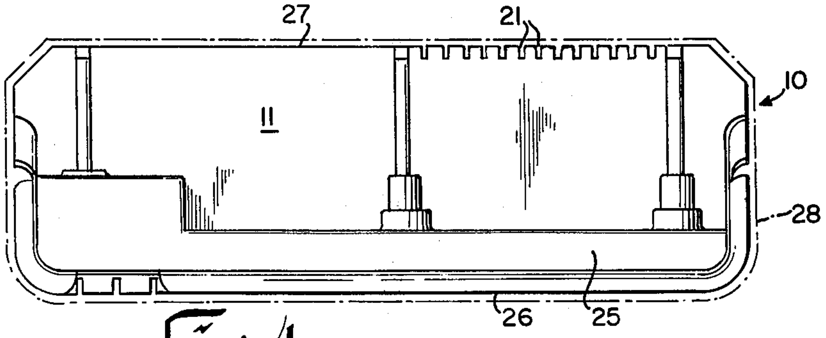
FIG. 4 is a view on the back of the frame of FIG. 1.
Figure 5:
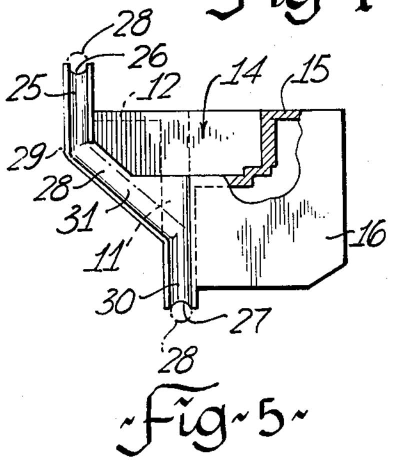
FIG. 5 is an end view in the direction of arrow A in FIG. 2.
Figure 6:
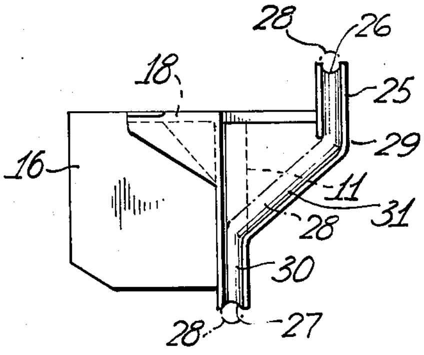
FIG. 6 is an end view in the direction of arrow B in FIG. 2.
Figure 7:
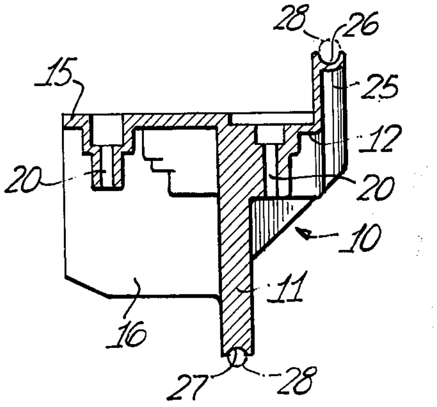
FIG. 7 is a cross-section on the line VII—VII of FIG. 1.
Figure 8:
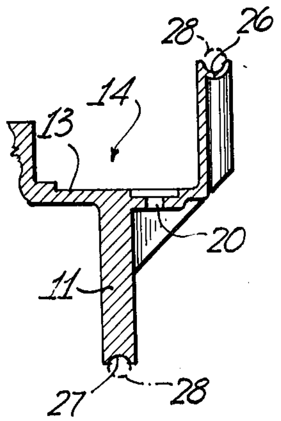
FIG. 8 is a cross-section on the line VIII—VIII of FIG. 1.

A further flange, top forward flange 15 extends forwardly from the top edge of the central web 11, for a part of the length of the web 11. The flange 15 has further side flanges 16 extending downwardly, side flanges 16 also being integral with a side face of the central web 11. There is thus formed a further recess or pocket 17. A microphone is positioned in this recess. In the example illustrated, the recess 17 is at the left hand end of the support frame, as seen in FIGS. 1, 2 and 3. At the other end no flange extends forward from the top edge of the central web 11. A bracket 18 is formed at the extreme end of the web 11, and a small projection 19 is formed on the end of flange 15, to provide mounting or attachment points for control items, in the present example a pushbutton switch assembly.

Various holes 20 are provided through which pass screws which screw into bosses provided on the base housing, securing the support frame to the base housing. A comb 21 is formed in the bottom edge of the central web, various electrical conductors to the pushbutton switch assembly being positioned in the slots of the comb.

Extending along the rear edge of the flange 12 is an upwardly extending rim 25. The top edge 26 of the rim 25 is concave in cross-section. The bottom edge 27 of the central web 11 is also concave in cross-section. The concave cross-sections serve as seats for a rubber ring 28 which extends all round the support frame. The seat formed by the top edge 26 of rim 25 is extended down each end of the rim 25, at 29 and similarly the seat formed by the bottom edge 27 of the central web 11 is extended part way up the ends of the web at 30. A further seat portion 31 extends at an angle across the ends of the support frame to connect the two seats on the central web 11 and the rim 25. For clarity the rubber ring 28 is indicated by dotted lines in the drawings.

When the rubber ring 28 is positioned on support frame, the ring tends to not sit in the inclined seat portions 31, but extends across more or less directly from the end of the top edge 25 to the bottom edge 27. However as the support frame is mounted in the base housing and as the top housing is attached to the base housing friction between the seal ring and the sides of the housing pushes the ring into the correct position in the seats. At final assembly of the support frame and base and top housings the rubber ring is in contact all the way round with the inner surfaces of the base and top housings, thus providing an effective acoustical seal. The recess 16 is completely sealed off from the rest of the unit housing.

What is claimed is:

1. A die cast support frame for a telephone set comprising a laterally extending web;

a rearward top flange extending rearwardly for at least a major part of the length of the top edge of said web in a direction rearward to the plane of said web;

a forward top flange extending forwardly of said web at the top edge thereof for a portion of the length of said web;

two side flanges extending downwardly from said forward top flange at each end thereof and also forwardly from a front surface of said web, said forward top flange, said side flanges forming with said web an enclosure for a microphone;

a bracket extending forwardly from the top edge of said web adjacent the end thereof remote from said forward top flange;

a projection on an end of said forward top flange nearer to said bracket, said bracket and said projection forming mounting positions for a pushbutton assembly, an upwardly extending rim along the rear edge of said rearward top flange, a rim extending along the bottom edge of said web, and connecting rims extending across each end of said frame connecting the ends of said rims on said rear edge of said rearward top flange and on said bottom edge of said web to form a substantially continuous rim around said frame, said rim having a concave cross-section to form a seating, and a resilient seal member positioned in said seating said seal member adapted to seat against an inner surface of a telephone housing when said support frame is positioned in said housing.

2. A support frame as claimed in claim 1, including a recess formed at one end of said rearward top flange and extending into said forward top flange, said recess providing an enclosure for an electrical control member for a circuit in said telephone set.

* * * * *